United States Patent
Zhu et al.

(10) Patent No.: US 11,757,127 B2
(45) Date of Patent: Sep. 12, 2023

(54) LITHIUM SOLID ELECTROLYTE AND METHOD OF MANUFACTURE THEREOF

(71) Applicants: SAMSUNG ELECTRONICS CO., LTD., Suwon-Si (KR); MASSACHUSETTS INSTITUTE OF TECHNOLOGY, Cambridge, MA (US)

(72) Inventors: Yuntong Zhu, Cambridge, MA (US); Won Seok Chang, Seoul (KR); Jennifer Rupp, Cambridge, MA (US); Lincoln Miara, Lincoln, MA (US)

(73) Assignees: SAMSUNG ELECTRONICS CO., LTD., Gyeonggi-do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 426 days.

(21) Appl. No.: 16/860,326

(22) Filed: Apr. 28, 2020

(65) Prior Publication Data
US 2020/0403269 A1 Dec. 24, 2020

Related U.S. Application Data

(60) Provisional application No. 62/863,059, filed on Jun. 18, 2019.

(51) Int. Cl.
*H01M 10/0562* (2010.01)
*H01M 10/0525* (2010.01)
*H01M 4/02* (2006.01)

(52) U.S. Cl.
CPC ... *H01M 10/0562* (2013.01); *H01M 10/0525* (2013.01); *H01M 2004/027* (2013.01);
(Continued)

(58) Field of Classification Search
CPC ........ H01M 10/0562; H01M 10/0525; H01M 2004/027; H01M 2004/028; H01M 2300/0068
See application file for complete search history.

(56) References Cited

U.S. PATENT DOCUMENTS

| | | |
|---|---|---|
| 6,884,514 B2 | 4/2005 | Simpson et al. |
| 7,901,658 B2 | 3/2011 | Weppner et al. |

(Continued)

FOREIGN PATENT DOCUMENTS

| | | |
|---|---|---|
| CN | 105406118 A | 3/2016 |
| CN | 106374085 A | 2/2017 |

(Continued)

OTHER PUBLICATIONS

Chen et al., Sol-gel derived Li—Sa—Zr—O thin films as solid electrolytes for lithium-ion batteries, Journal of Materials Chemistry A, vol./issue 2, pp. 13277-13282 (Year: 2014).*

(Continued)

*Primary Examiner* — Jayne L Mershon
(74) *Attorney, Agent, or Firm* — CANTOR COLBURN LLP

(57) ABSTRACT

A method of manufacturing a lithium solid electrolyte, the method including: providing a composition including a lithium precursor, a lanthanum precursor, and a zirconium precursor; disposing the composition on a substrate having a temperature of 270° C. to 500° C. to form a film; and heat-treating the film at 300° C. to less than 750° C. for 1 hour to 100 hours to manufacture the lithium solid electrolyte.

17 Claims, 8 Drawing Sheets

(52) U.S. Cl.
CPC ............. *H01M 2004/028* (2013.01); *H01M 2300/0068* (2013.01)

(56) References Cited

U.S. PATENT DOCUMENTS

| | | | |
|---|---|---|---|
| 8,658,317 | B2 | 2/2014 | Weppner et al. |
| 9,093,717 | B2 | 7/2015 | Sakamoto et al. |
| 9,450,271 | B2 | 9/2016 | Weppner et al. |
| 10,008,742 | B2 | 6/2018 | Holme et al. |
| 2015/0111110 | A1 | 4/2015 | Watanabe et al. |
| 2015/0200420 | A1* | 7/2015 | Holme ............... C04B 35/495 429/322 |
| 2016/0056500 | A1 | 2/2016 | Holme et al. |
| 2016/0133990 | A1 | 5/2016 | Schwanz et al. |
| 2016/0141108 | A1 | 5/2016 | Inahara |
| 2017/0301958 | A1* | 10/2017 | Deng ............... H01M 10/0404 |
| 2017/0363928 | A1 | 12/2017 | Cloots et al. |
| 2018/0026299 | A1 | 1/2018 | Son et al. |
| 2018/0138546 | A1 | 5/2018 | Sung et al. |
| 2018/0175446 | A1 | 6/2018 | Nishizaki et al. |
| 2018/0309136 | A1* | 10/2018 | Vieluf ............... H01M 4/8825 |
| 2018/0375151 | A1 | 12/2018 | Gaben et al. |
| 2020/0044281 | A1 | 2/2020 | Zhu et al. |
| 2020/0044282 | A1 | 2/2020 | Zhu et al. |

FOREIGN PATENT DOCUMENTS

| | | |
|---|---|---|
| JP | 2014002965 A | 1/2014 |
| WO | 2018089430 A1 | 5/2018 |

OTHER PUBLICATIONS

U.S. Non Final Office Action issued for U.S. Appl. No. 16/225,068, filed Dec. 19, 2019; dated May 29, 2020; 21 pages.

U.S. Final Office Action issued for U.S. Appl. No. 16/224,968, filed Dec. 19, 2018; dated Jun. 28, 2021; 17 pages.

U.S. Non-Final Office Action issued for U.S. Appl. No. 16/225,068, filed Dec. 19, 2018; dated Jul. 7, 2021; 16 pages.

NIST URL: hhttps://www.nist.gov/pmi/weights-and-measures/si-units-temperature (Year: 2010) 7 pages.

U.S. Final Office Action issued for U.S. Appl. No. 16/225,068, filed Dec. 19, 2018; dated Mar. 15, 2021; 22 pages.

U.S. Non Final Office Action issued for U.S. Appl. No. 16/224,968, filed Dec. 19, 2018; dated Feb. 3, 2021; 29 pages.

Ashby, D., et al., "Patternable, Solution-Processed Ionogels for Thin-Film Lithium-Ion Electrolytes," Joule, 1, Oct. 11, 2017, pp. 344-358.

Bitzer, M., et al., "Sol-gel synthesis of thin solid $Li_7La_3Zr_2O_{12}$ electrolyte films for Li-ion batteries," Thin Solid Films, 615 (2016), pp. 128-134.

Chen, C.H., et al., "Electrode and solid electrolyte thin films for secondary lithium-ion batteries," Journal of Power Sources, 68 (1997), pp. 377-380.

Chen, R-J, et al., "Sol-gel derived Li—La—Zr—O thin films as solid electrolytes for lithium-ion batteries," J. Mater. Chem. A, 2014, 2, pp. 13277-13282.

Djenadic, R., et al., "Nebulized spray pyrolysis of Al-doped $Li_7La_3Zr_2O_{12}$ solid electrolyte for battery applications," Solid State Ionics, 263, 2014, pp. 49-56.

Garbayo, I., et al., "Glass-Type Polyamorphism in Li-Garnet Thin Film Solid State Battery Conductors," Adv. Energy Mater., 2018, 8, 1702265 (14 pages).

Huang, X., et al., "Method Using Water-Based Solvent to Prepare $Li_7La_3Zr_2O_{12}$ Solid Electrolytes," ACS Appl. Mater. Interfaces 2018, 10, pp. 17147-17155.

Kazyak, E., et al., "Atomic Layer Deposition of the Solid Electrolyte Garnet $Li_7La_3Zr_2O_{12}$," Chem. Mater., 2017, 29, pp. 3785-3792.

Lee, G., et al., "Fabrication of a stretchable and patchable array of high performance micro-supercapacitors using a non-aqueous solvent based gel electrolyte," Energy Environ. Sci., 2015, 8, pp. 1764-1774.

Rawlence, M., et al., "Effect of Gallium Substitution on Lithium-Ion Conductivity and Phase Evolution in Sputtered $Li_{7-3x}Ga_xLa_3Zr_2O_{12}$ Thin Film," ACS Appl. Mater. Interfaces, 2018, 10, pp. 13720-13728.

Solano, M., "Development of artificial surface layers for thin film cathode materials," Material chemistry, Université de Bordeaux, 2015, English, submitted on Jun. 7, 2016, 160 pages.

Van Den Broek, J., et al., "Boosting the electrochemical performance of Li-garnet based all-solid-state batteries with $Li_4Ti_5O_{12}$ electrode: Routes to cheap and large scale ceramic processing," J Electroceram (2017), 38, pp. 182-188.

Wang, B., et al., "Sol-gel-derived amperometric biosensor for hydrogen peroxide based on methylene green incorporated in Nafion film," Talanta, 51 (2000), pp. 565-572.

Non Final Office Action issued for U.S. Appl. No. 16/225,068, filed Dec. 19, 2018; dated Oct. 19, 2020; 11 pages.

* cited by examiner

LITHIUM SOLID ELECTROLYTE AND METHOD OF MANUFACTURE THEREOF

CROSS-REFERENCE TO RELATED APPLICATION

This application claims priority to U.S. Provisional Patent Application No. 62/863,059, filed on Jun. 18, 2019, in the United States Patent and Trademark Office, and all the benefits accruing therefrom under 35 U.S.C. § 119, the content of which is incorporated herein in its entirety by reference.

BACKGROUND

1. Field

Disclosed is a lithium solid electrolyte, a method of making the same, and a lithium battery including the same.

2. Description of the Related Art

A battery including a solid-state electrolyte can potentially offer improved safety, and in some configurations provide improved specific energy and energy density. Garnet-type oxides can provide promising lithium-ion conductivity. It would thus be desirable to use a garnet-type oxide electrolyte in a solid-state lithium-ion battery. However, there remains a need for a scalable method of manufacture of a garnet-type electrolyte in a suitable form which also provides suitable lithium-ion conductivity.

SUMMARY

Disclosed is a method of manufacturing a lithium solid electrolyte, the method including: providing a composition including a lithium precursor, a lanthanum precursor, and a zirconium precursor; disposing the composition on a substrate having a temperature of 270° C. to 500° C. to form a film; and heat-treating the film at 300° C. to less than 750° C. for 1 hour to 100 hours to manufacture the lithium solid electrolyte.

Also disclosed is a lithium solid electrolyte of Formula 1

$$Li_{(7.2-2x-3y)}A_xM_yLa_3Zr_2O_{12} \quad (1)$$

wherein A is Ca or Mg, M is Al or Ga, and wherein 0≤x≤0.5 and 0≤y≤0.5, and having a local stress of 10 megaPascals to 10 gigaPascals, when determined by multi-beam optical sensing.

Also disclosed is a negative electrode for a lithium battery, the negative electrode including: lithium metal; and the lithium solid electrolyte on the lithium metal.

Also disclosed is a lithium battery including: a positive electrode; a negative electrode; and the lithium solid electrolyte between the positive electrode and the negative electrode.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
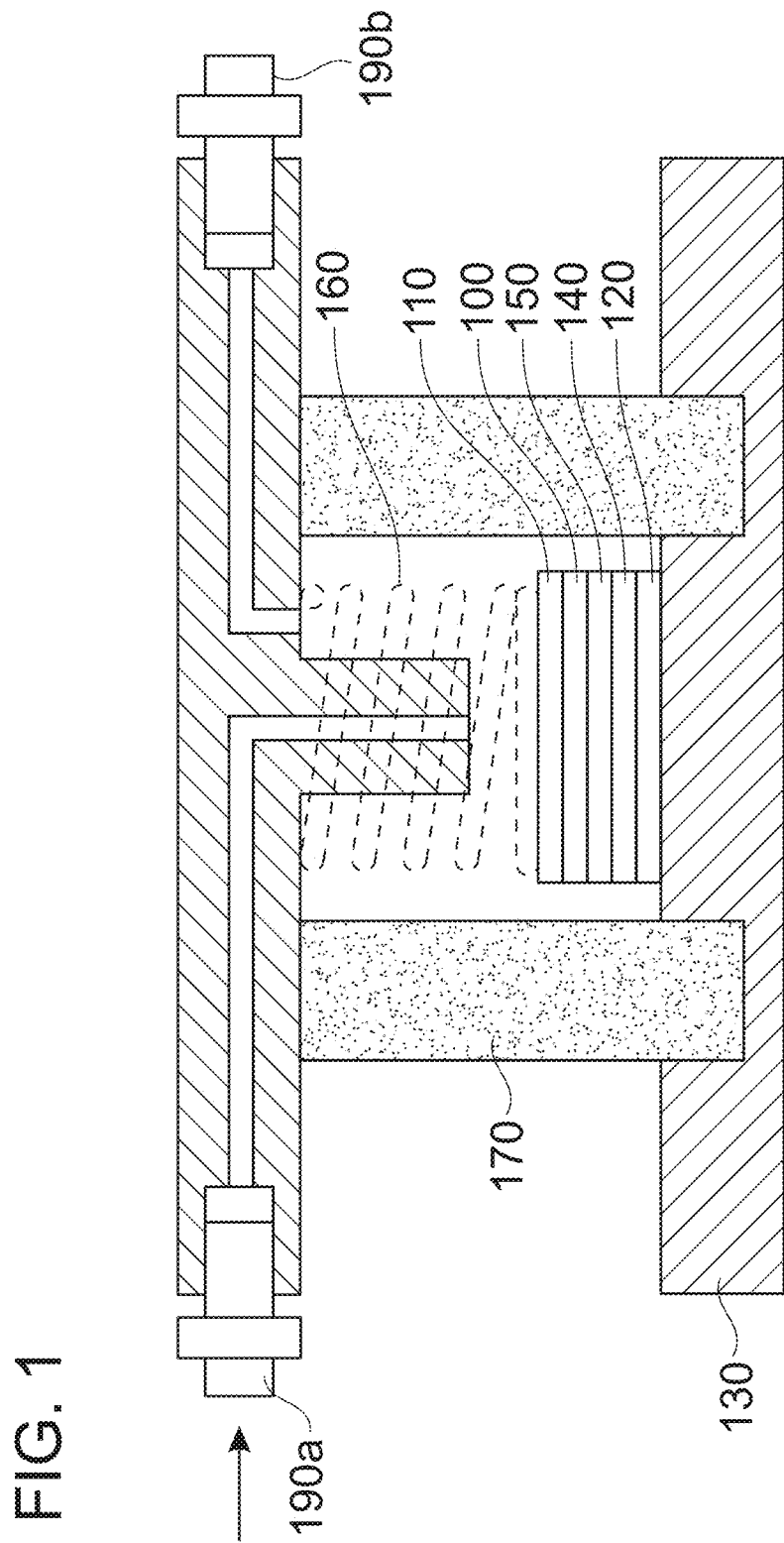
FIG. 1 is a schematic diagram of lithium air battery.

Lithium lanthanum zirconium oxide (LLZO) garnet-type solid-state electrolytes are currently synthesized by bulk-type methods, e.g., sintering a pressed pellet, or sintering a compressed tape. LLZO garnet-type solid-state electrolytes can have desirable conductivity, however the processing methods, while suitable for laboratory setting, are difficult to economically implement in a manufacturing environment. Alternatively, methods to provide thin-films of LLZO by vacuum techniques are known, however such methods are economically unsuitable for scalable production.

Lithium garnets (e.g., $Li_7La_3Zr_2O_{12}$, "LLZO") adopt tetragonal and cubic phases. The cubic phase is desirable because its lithium ion conductivity is greater than that of the tetragonal phase, however the cubic phase is difficult to stabilize.

The inventors have surprisingly discovered a method to manufacture a lithium garnet-type solid-state electrolyte having desirable cubic phase at lower temperatures than previously reported. Further, the disclosed lithium garnet-type solid-state electrolyte has unexpectedly improved properties. While not wanting to be bound by theory, and as further discussed herein, it is understood that the improved properties are a result of reduced local stress, e.g., reduced local tensile stress, and reduced residual stress in the disclosed material, which are understood to stabilize the cubic phase and prevent transition to the tetragonal phase.

Disclosed is a method of manufacturing a lithium solid electrolyte, the method comprising: providing a composition comprising a lithium precursor, a lanthanum precursor, and a zirconium precursor; disposing the composition on a substrate having a temperature of 270° C. to 500° C. to form a film; and heat-treating the film at 300° C. to less than 750° C. for 1 hour to 100 hours to manufacture the lithium solid electrolyte.

The composition comprises a lithium precursor, a lanthanum precursor, and a zirconium precursor, and may further comprise a calcium precursor, a magnesium precursor, an aluminum precursor, a gallium precursor, or a combination thereof. Suitable compounds for the precursor include an acetate, acetylacetonate, benzoate, carbonate, citrate, formate, hydroxide, nitrate, oxide, oxalate, peroxide, tartrate, or a combination thereof, of the desired element of the electrolyte, i.e., lithium, lanthanum, and zirconium, and calcium, magnesium, aluminum, gallium, or a combination thereof. In an aspect, precursor comprises a plurality of lithium, lanthanum, zirconium, and optionally calcium, magnesium, aluminum, gallium, or a combination thereof.

Representative precursor compounds comprising lithium include lithium acetate, lithium acetoacetate, lithium carbonate, lithium hydroxide, lithium nitrate, lithium oxalate, lithium oxide, lithium peroxide, or a combination thereof.

Representative precursor compounds comprising lanthanum include lanthanum acetate, lanthanum acetoacetate, lanthanum carbonate, lanthanum hydroxide, lanthanum nitrate, lanthanum oxide, lanthanum oxalate, lanthanum peroxide, or a combination thereof.

Representative precursor compounds comprising zirconium include zirconium acetate, zirconium acetoacetate, zirconium carbonate, zirconium hydroxide, zirconium nitrate, zirconium oxalate, zirconium oxide, zirconium peroxide, or a combination thereof.

Representative precursor compounds comprising calcium include calcium acetate, calcium carbonate, calcium hydroxide, calcium nitrate, calcium oxalate, calcium oxide, or a combination thereof.

Representative precursor compounds comprising magnesium include magnesium acetate, magnesium carbonate, magnesium formate, magnesium hydroxide, magnesium nitrate, or a combination thereof.

Representative precursor compounds comprising aluminum include aluminum acetate, aluminum acetoacetate, aluminum carbonate, aluminum hydroxide, aluminum nitrate, aluminum oxalate, aluminum oxide, aluminum peroxide, or a combination thereof.

Representative precursor compounds comprising gallium include gallium acetate, gallium carbonate, gallium citrate, gallium hydroxide, gallium nitrate, gallium oxide, or a combination thereof.

If desired, the precursor compound may be a hydrate. For example, use of $La(NO_3)_3 \cdot 6H_2O$, $Al(NO_3)_3 \cdot 9H_2O$, or a combination thereof, are mentioned.

The composition comprises a solvent. The solvent may comprise a substituted or unsubstituted C1 to C20 alcohol, a substituted or unsubstituted C10 to C40 ester, a substituted or unsubstituted C2 to C20 carbonate, a substituted or unsubstituted C1 to C20 ketone, water, or a combination thereof. Use of a substituted or unsubstituted alcohol, a substituted or unsubstituted ester, a substituted or unsubstituted carbonate, a substituted or unsubstituted ketone, or a combination thereof is mentioned. In an aspect, the solvent comprises a substituted or unsubstituted C1 to C10 alcohol and an ester. In an aspect, the first solvent is an unsubstituted alcohol, the second solvent is a substituted alcohol, and the third solvent is a substituted or unsubstituted carbonate, a substituted or unsubstituted ester, or a substituted or unsubstituted ketone. Use of methanol, a substituted propanol, and a substituted phthalate, are mentioned. In an embodiment, disclosed is a composition comprising methanol, a substituted propanol, e.g., 1-methoxy-2-propanol, and a phthalate, such as bis(2-ethylhexyl) phthalate.

A content of each solvent may be independently selected. For example, in a composition comprising an alcohol and a phthalate, a content of the alcohol may be 1 volume percent (vol %) to 99 vol %, 5 vol % to 95 vol %, 10 vol % to 90 vol %, 20 vol % to 80 vol %, or 30 vol % to 70 vol %, 40 vol % to 60 vol %, or 45 vol % to 55 vol %, and a content of the phthalate may be 99 vol % to 1 vol %, 95 vol % to 5 vol %, 90 vol % to 10 vol %, 80 vol % to 20 vol %, 70 vol % to 30 vol %, 60 vol % to 40 vol %, or 55 vol % to 45 vol %, based on at total volume of the solvents. In an aspect in which a plurality of alcohols are used, a content of each alcohol may be independently selected, and each alcohol may be contained in an amount of e.g., 1 vol % to 99 vol %, 5 vol % to 95 vol %, 10 vol % to 90 vol %, 20 vol % to 80 vol %, or 30 vol % to 70 vol %, based on at total volume of the alcohols. In an aspect, the composition comprises a first solvent, a second solvent, and third solvent. A content of the first solvent, the second solvent, and the third solvent maybe independently selected, and each may be contained in an amount of 1 vol % to 99 vol %, 5 vol % to 95 vol %, 10 vol % to 90 vol %, 20 vol % to 80 vol %, 30 vol % to 70 vol %, 40 vol % to 60 vol %, or 45 vol % to 55 vol %, based on a total volume of the solvents. In an aspect, a content of the first solvent, a content of the second solvent, and a content of the third solvent are each independently 1 vol % to 50 vol %, 2 vol % to 45 vol %, 5 vol % to 40 vol %, or 10 vol % to 35 vol %, based on a total volume of the solvents.

A boiling point of the solvent combination can be 50° C. to 250° C., 75° C. to 225° C., or 100° C. to 200° C. Use of a solvent combination having a boiling point of 190° C. is mentioned.

The concentration of the precursor compound in the solvent may be a concentration which is suitable for spray pyrolysis. The concentration of each precursor compound in the solvent is 0.001 molar (M) to 0.1 M, 0.005 M to 0.05 M, or 0.01 M. Use of a precursor concentration based on the selected compound of Formula 1, $$Li_{(7.2-2x-3y)}A_xM_yLa_3Zr_2O_{12} \qquad (1)$$

wherein A is Ca or Mg, M is Al or Ga, wherein $0 \leq x \leq 0.5$, $0 \leq y \leq 0.5$, of 0.005 M to 0.1 M is mentioned. For example, a compound of Formula 1 may be $Li_{6.25}Al_{0.25}La_3Zr_2O_{12}$.

Use of a stoichiometric excess of the lithium precursor is disclosed. The precursor composition may comprise a stoichiometric excess of the lithium precursor, based on a stoichiometry for the compound of Formula 1. The stoichiometric excess of the compound comprising lithium may be 10% to 400%, 20% to 350%, or 40% to 300%, based on a stoichiometry for the compound of Formula 1. Use of a stoichiometric excess of 75% for the compound comprising lithium, corresponding to $Li_{11}$ in the compound of Formula 1, for example, in the composition is mentioned.

Providing the composition may comprise purchasing the composition, or contacting the precursor compound and the solvent to form the composition. The composition is a composition suitable for spray pyrolysis, and may be a solution, or may comprise suspended solids. The contacting may comprise stirring, shaking, heating, cooling, filtering, or a combination thereof.

The composition is disposed on a substrate. The substrate may comprise any suitable material, and may comprise an oxide, a carbide such as SiC, a nitride, a metal, or a combination thereof. Oxide substrates include $Al_2O_3$, MgO, $SiO_2$, indium tin oxide, zinc oxide, indium tin zinc oxide, or a combination thereof. The oxide may be further comprise iron, titanium, chromium, copper, magnesium, or a combination thereof. A metal substrate may comprise Ti, Ni, stainless steel, or combination thereof. Use of MgO is mentioned.

The disposing of the composition on the substrate comprises spray pyrolysis. In further detail, the composition is sprayed to provide a droplet of the composition, which contacts the substrate. To form a droplet, the composition is sprayed at a suitable pressure, e.g., 0.01 megaPascals (MPa) to 0.1 MPa, wherein the pressure selected to obtain the droplet depends on the spray apparatus. For example, when using a DeVilbiss AG361 spray gun, a pressure of 0.03 MPa is suitable. A carrier gas may comprise nitrogen, argon, helium, or a combination thereof. Use of air is mentioned. A pressure of the carrier gas may be selected to provide suitable atomization of the composition, e.g., a pressure of 0.01 MPa to 0.1 MPa, 0.02 MPa to 0.08 MPa, or 0.03 MPa to 0.06 MPa.

The substrate is heated. A temperature of the substrate may be 100° C. to 500° C., 125° C. to 450° C., 150° C. to 400° C., or 200° C. to 350° C. While not wanting to be bound by theory, it is understood that the solvent is evaporated or decomposes to form a gaseous product, leaving the non-solvent components of the composition, a reaction product, or derivative thereof, on the substrate. The reaction product or derivative thereof may comprise, or consist of, a compound of Formula 1.

The non-solvent components of the composition, or a reaction product or derivative thereof, on the substrate may be in the form of a film, e.g., a layer of the composition, a reaction product, or derivative thereof having a thickness of 0.1 μm to 100 μm, 0.5 μm to 50 μm, or 0.1 μm to 25 μm. The film may comprise the compound of Formula 1.

The film is then heat-treated at 300° C. to 750° C., 325° C. to 700° C., 350° C. to 650° C., 375° C. to 600° C., or 400° C. to 550° C. for 1 hour (h) to 100 h, 2 h to 80 h, 3 h to 60 h, 4 h to 50 h, or 5 h to 40 h, to manufacture the lithium solid electrolyte.

The lithium solid electrolyte comprises the compound of Formula 1,

$$\mathrm{Li}_{(7.2-2x-3y)}\mathrm{A}_x\mathrm{M}_y\mathrm{La}_3\mathrm{Zr}_2\mathrm{O}_{12} \quad (1)$$

wherein A is Ca or Mg, M is Al or Ga, wherein $0 \leq x \leq 0.5$, $0 \leq y \leq 0.5$. In an aspect, $0 \leq x \leq 0.5$, $0 \leq x \leq 0.5$, $0 \leq x \leq 0.5$, $0.1 \leq x \leq 0.4$, or $0.1 \leq x \leq 0.4$, and $0 \leq y \leq 0.5$, $0 \leq y \leq 0.5$, $0 \leq y \leq 0.5$, $0.1 \leq y \leq 0.4$, $0.1 \leq y \leq 0.4$.

The disclosed lithium solid electrolyte has an unexpectedly high degree of crystallinity for a material processed at a temperature no greater than 750° C., e.g., 300° C. to 700° C. A degree of crystallinity of the lithium solid electrolyte is 50% to 100%, 55% to 99%, 60% to 98%, 70% to 96%, or 75% to 90%. The degree of crystallinity may be determined by X-ray diffraction, e.g., as disclosed in Gualtieri A. F. et al. (2019) Period. Mineral. 88, 147-151, the content of which is incorporated by reference in its entirety.

The disclosed lithium solid electrolyte has an unexpectedly improved lithium-ion conductivity. While not wanting to be bound by theory, it is understood that improved conductivity is a result of reduced local stress in the lithium solid electrolyte. In aspect, the lithium solid electrolyte has a local stress of 10 megaPascal (MPa) to 10 gigaPascals (GPa), 50 MPa to 5 GPa, or 100 MPa to 1 GPa, when determined by multi-beam optical sensing. Local stress can be determined as described in Sethuraman, Vijay A., et al., "In situ measurements of stress-potential coupling in lithiated silicon." Journal of The Electrochemical Society 157.11 (2010): A1253-A1261, the content of which is incorporated by reference in its entirety.

While not wanting to be bound by theory, it is understood that the disclosed lithium solid electrolyte has reduced local stress or reduced lattice strain, relative to a stoichiometrically identical lithium solid electrolyte that has been heat-treated at greater than 750° C., e.g., 750° C. to 1000° C. While not wanting to be bound by theory, it is understood that indicative of the local stress or lattice strain is the shifting of peaks in a Raman spectrum of them material. The reduced local stress or lattice strain can be observed by the shifting of peaks in the Raman spectrum to a greater wavenumber, relative to the wavenumber of the resonance in cubic $\mathrm{Li}_7\mathrm{La}_3\mathrm{Zr}_2\mathrm{O}_{12}$. For example, cubic $\mathrm{Li}_7\mathrm{La}_3\mathrm{Zr}_2\mathrm{O}_{12}$ has a peak that theoretically is centered at 360 cm$^{-1}$, with a shoulder centered at 410 cm$^{-1}$. The disclosed material has a corresponding peak at a wavenumber 0 cm$^{-1}$ to 50 cm$^{-1}$, 5 cm$^{-1}$ to 45 cm$^{-1}$, 10 cm$^{-1}$ to 40 cm$^{-1}$, or 15 cm$^{-1}$ to 35 cm$^{-1}$ greater than the corresponding peak in cubic $\mathrm{Li}_7\mathrm{La}_3\mathrm{Zr}_2\mathrm{O}_{12}$, when analyzed by Raman spectroscopy. For example, the peak observed in a Raman spectrum of cubic $\mathrm{Li}_7\mathrm{La}_3\mathrm{Zr}_2\mathrm{O}_{12}$ at 360 cm$^{-1}$ may be observed in a Raman spectrum of the lithium solid electrolyte at 360 cm$^{-1}$ and 410 cm$^{-1}$, 365 cm$^{-1}$ and 405 cm$^{-1}$, 370 cm$^{-1}$ and 400 cm$^{-1}$, or 375 cm$^{-1}$ to 395 cm$^{-1}$. Also, the shoulder centered at 410 cm$^{-1}$ in cubic $\mathrm{Li}_7\mathrm{La}_3\mathrm{Zr}_2\mathrm{O}_{12}$ may be observed in a Raman spectrum of the lithium solid electrolyte at 410 cm$^{-1}$ to 460 cm$^{-1}$, 415 cm$^{-1}$ to 455 cm$^{-1}$, 420 cm$^{-1}$ to 450 cm$^{-1}$, or 425 cm$^{-1}$ to 445 cm$^{-1}$.

The disclosed material also has reduced local stress or lattice strain, relative to a stoichiometrically identical lithium solid electrolyte that has been heat-treated at greater than 750° C., e.g., 750° C. to 1000° C. While not wanting to be bound by theory, it is understood that the reduced local stress or lattice strain in the disclosed lithium solid electrolyte contributes to the improved ion conductivity. While not wanting to be bound by theory, it is understood that local tensile stress provides increased lattice spacing, providing larger ion transport channels. The larger ion transport channels are understood to provide improved ion transport from reduced ion transport activation energy, resulting in the observed improved room temperature ionic conductivity. In aspect, the lithium solid electrolyte has a local tensile stress of 10 megaPascals (MPa) to 10 gigaPascals (GPa), 50 MPa to 5 GPa, or 100 MPa to 1 GPa, when determined when determined by multi-beam optical sensing. Local tensile stress can be determined by multi-beam optical sensing, e.g., wafer/substrate curvature measurements, or as described in E. Chason and P. R. Guduru, "Tutorial: Understanding residual stress in polycrystalline thin films through real-time measurements and physical models," Journal of Applied Physics, vol. 119, 191101 (2016), the content of which is incorporated herein by reference in its entirety.

Also disclosed is a lithium solid electrolyte of Formula 1

$$\mathrm{Li}_{(7.2-2x-3y)}\mathrm{A}_x\mathrm{M}_y\mathrm{La}_3\mathrm{Zr}_2\mathrm{O}_{12} \quad (1)$$

wherein A is Ca or Mg, M is Al or Ga, and wherein $0 \leq x \leq 0.5$ and $0 \leq y \leq 0.5$, and having a local stress of 10 MPa to 10 GPa, when determined by multi-beam optical sensing. The lithium solid electrolyte may be prepared by the spray pyrolysis method disclosed herein. Other methods, such as drop casting, sputtering, or chemical vapor deposition may be used. Also, the disclosed material has a peak corresponding to a peak in cubic $\mathrm{Li}_7\mathrm{La}_3\mathrm{Zr}_2\mathrm{O}_{12}$ at a wavenumber 0 cm$^{-1}$ to 50 cm$^{-1}$, 5 cm$^{-1}$ to 45 cm$^{-1}$, 10 cm$^{-1}$ to 40 cm$^{-1}$, or 15 cm$^{-1}$ to 35 cm$^{-1}$ greater than the corresponding peak in cubic $\mathrm{Li}_7\mathrm{La}_3\mathrm{Zr}_2\mathrm{O}_{12}$, when analyzed by Raman spectroscopy. For example, the peak in a Raman spectrum of cubic $\mathrm{Li}_7\mathrm{La}_3\mathrm{Zr}_2\mathrm{O}_{12}$ at 360 cm$^{-1}$ may be observed in a Raman spectrum of the lithium solid electrolyte at 360 cm$^{-1}$ to 410 cm$^{-1}$, 365 cm$^{-1}$ to 405 cm$^{-1}$, 370 cm$^{-1}$ to 400 cm$^{-1}$, or 375 cm$^{-1}$ to 395 cm$^{-1}$. Also, the shoulder centered at 410 cm$^{-1}$ in cubic $\mathrm{Li}_7\mathrm{La}_3\mathrm{Zr}_2\mathrm{O}_{12}$ may be observed in a Raman spectrum of the lithium solid electrolyte at 410 cm$^{-1}$ to 460 cm$^{-1}$, 415 cm$^{-1}$ to 455 cm$^{-1}$, 420 cm$^{-1}$ to 450 cm$^{-1}$, or 425 cm$^{-1}$ to 445 cm$^{-1}$.

The disclosed lithium solid electrolyte may be disposed on a current collector to provide a negative electrode for an anodeless lithium battery. As used herein, the term "anodeless" refers to a lithium battery which is not comprise lithium metal as manufactured, and the lithium metal is deposited on the negative electrode current collector on the first charge.

Disclosed lithium solid electrolyte may be used to provide a protection layer for lithium metal, e.g., in a lithium battery. For example, the lithium solid electrolyte may be disposed, e.g., formed, on lithium metal. In an aspect, the lithium solid electrolyte is provided in the form of a layer on the lithium metal to protect the lithium metal from reaction with air, for example, in an air battery. Alternatively, the lithium solid electrolyte may be provided in the form of a layer on the lithium metal to protect the lithium metal from reaction with a liquid electrolyte in a lithium battery comprising a liquid electrolyte.

Also disclosed is a negative electrode active material comprising a layer comprising the lithium solid electrolyte as a protection layer. For example, in a lithium ion battery comprising a liquid electrolyte, carbon may be used as a negative electrode active material, and the lithium solid electrolyte may be disposed on the carbon to protect the carbon from an undesirable reaction with the liquid electrolyte, for example.

Also disclosed is a positive electrode for an air battery, in which the lithium solid electrolyte is provided as a protection layer for the positive electrode active material. For example, a positive electrode for an air battery may comprise carbon, and the lithium solid like may be provided in the form of a protection layer on the carbon to avoid undesired reaction of the carbon with air, for example.

Also disclosed is a positive active material for a lithium ion battery, in which the lithium solid electrolyte is provided as a protection layer for the positive electrode active material. For example, a positive electrode active material may comprise an oxide such as lithium cobalt oxide, lithium nickel manganese cobalt oxide, or lithium nickel aluminum cobalt oxide, or a phosphate, such as lithium iron phosphate or lithium cobalt phosphate, and the lithium solid electrolyte may be provided in the form of a protection layer on the positive active material to avoid undesired reaction of the positive active material with a liquid electrolyte, for example.

Also disclosed is a lithium battery comprising: a positive electrode; a negative electrode; and the lithium solid electrolyte between the positive electrode and the negative electrode.

The lithium battery may be a lithium air battery, as shown in FIG. 1. The lithium air battery may comprise a cathode 100 adjacent to a first current collector 110 and configured to use oxygen as an active material, an anode 120 adjacent to a second current collector 120 and including lithium, and a first electrolyte 140 between the cathode 100 and the anode 120. The first electrolyte 140 may comprise the disclosed lithium solid electrolyte, and may further comprise a microporous separator, e.g., a microporous separator impregnated with a liquid electrolyte. An optional second electrolyte 150 may be between the cathode 100 and the first electrolyte 140. The second electrolyte 150 may comprise the lithium solid electrolyte, and may comprise a microporous separator, e.g., a microporous separator impregnated with a liquid electrolyte. The first current collector 110, which is porous, may serve as a gas diffusion layer, or a separate gas diffusion layer, e.g., a porous carbon paper, may be used. Also, a pressing member 160 that allows air to reach the cathode 100 may be on the first current collector 110. A case 170 formed of an insulating resin between the cathode and the anode may electrically insulate the cathode and the anode from each other. Air may be supplied through an air inlet 190a and be discharged through an air outlet 190b. The lithium air battery may be disposed in a stainless steel (SUS) container (not shown).

The term "air" as it relates to a lithium air battery, as used herein, is not limited to atmospheric air, and may refer to any suitable combination of gases including oxygen, or pure oxygen gas. This definition of "air" also applies to other terms including "air battery" and "air electrode."

Figure 2:
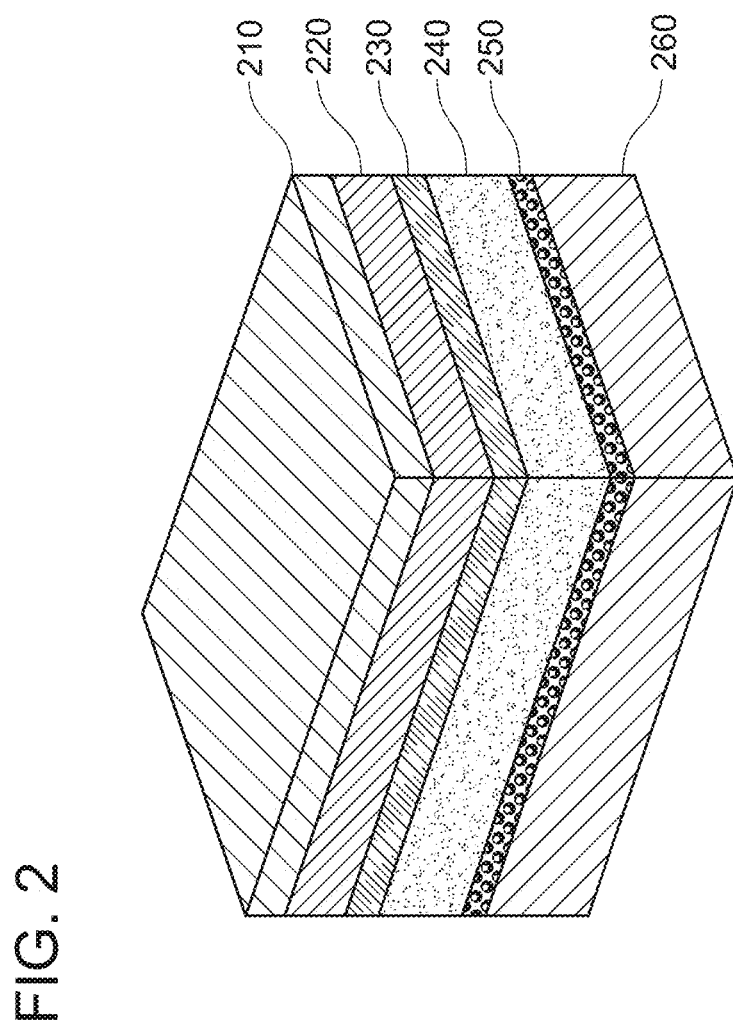
FIG. 2 is a schematic diagram of a lithium battery.

The lithium battery may be a lithium battery, e.g., a lithium metal battery as shown in FIG. 2, or an anodeless lithium battery. The lithium battery may comprise the solid-state electrolyte in the positive electrode, the electrolyte, the separator, the negative electrode, or a combination thereof. As shown schematically in the electrochemical cell of FIG. 2, the negative electrode 220 can be used in combination with a positive electrode 250 comprising the positive active material and a solid electrolyte layer 230 provided between the negative electrode and the positive electrode. Optionally, a separator 240, e.g., a separator comprising a microporous olefin film and a liquid electrolyte, may be provided between the positive electrode and the negative electrode, optionally proximate to the negative electrode or proximate to the positive electrode as shown in FIG. 2.

Figure 3:
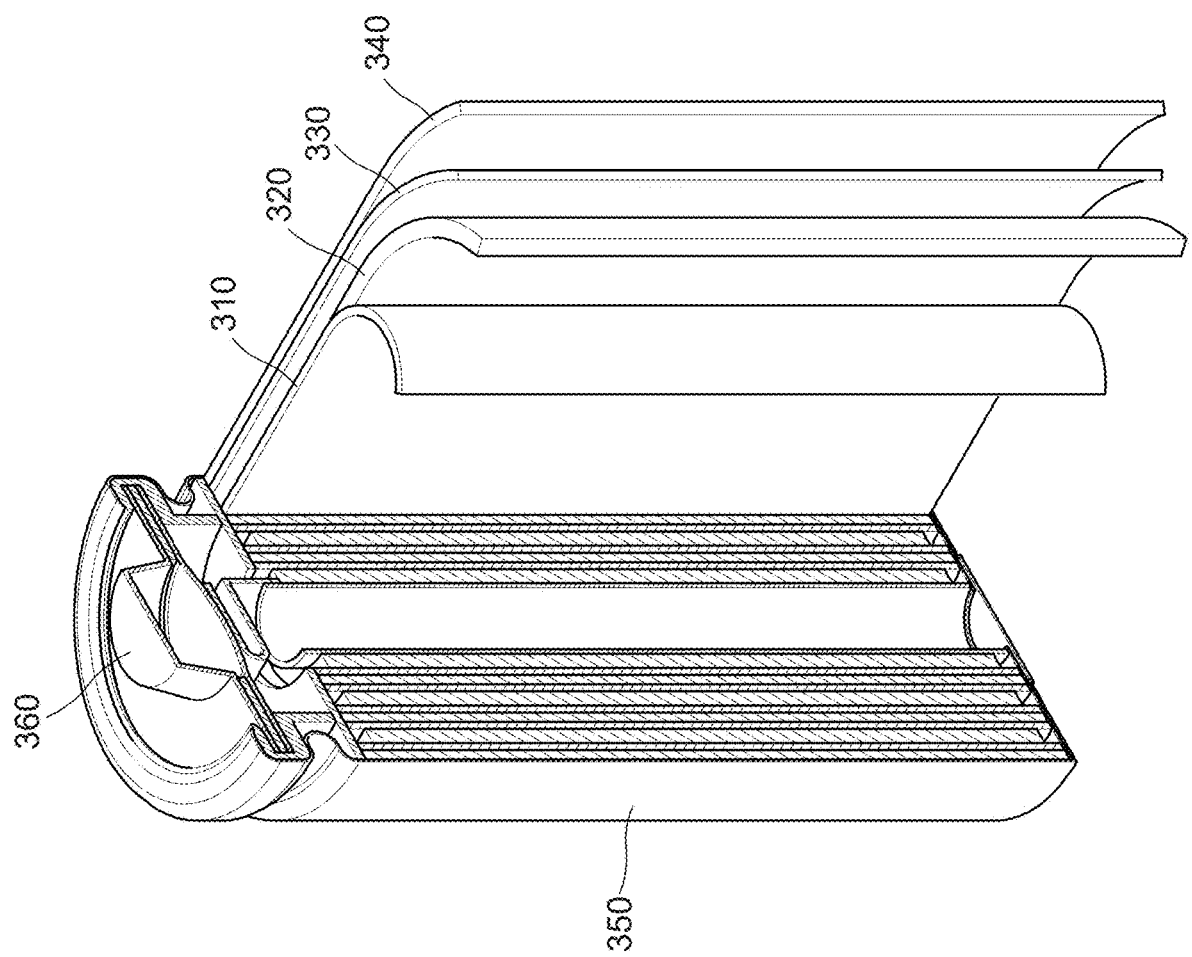
FIG. 3 is a schematic diagram of a lithium battery.

In an aspect, the battery may have a cylindrical wound configuration, as shown in FIG. FIG. 3. The electrochemical cell may comprise positive electrode 310, a negative electrode 330, and a solid electrolyte layer 320 provided between the positive electrode and the negative electrode. Optionally, a separator 330, e.g., a separator comprising a microporous olefin film and a liquid electrolyte, may be provided between the positive electrode and the negative electrode, optionally proximate to the positive electrode or proximate to the negative electrode as shown in FIG. 3. Also shown in FIG. 3 is can 350 and a header 360.

The positive electrode can be prepared by forming a positive active material layer including a positive active material on a current collector. The current collector may comprise aluminum, for example.

The positive active material can comprise a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: $Li_aA_{1-b}M_bD_2$ wherein $0.90 \leq a \leq 1.8$ and $0 \leq b \leq 0.5$; $Li_aE_{1-b}M_bO_{2-c}D_c$ wherein $0.90 \leq a \leq 1.8$, $0 \leq b \leq 0.5$, and $0 \leq c \leq 0.05$; $LiE_{2-b}M_bO_{4-c}D_c$ wherein $0 \leq b \leq 0.5$ and $0 \leq c \leq 0.05$; $Li_aNi_{1-b-c}Co_bM_cD$, wherein $0.90 \leq a \leq 1.8$, $0 \leq b \leq 0.5$, $0 \leq c \leq 0.05$, and $0 \leq \alpha \leq 2$; $Li_aNi_{1-b-c}Co_bM_cO_{2-\alpha}X_c$, wherein $0.90 \leq a \leq 1.8$, $0 \leq b \leq 0.5$, $0 \leq c \leq 0.05$, and $0 \leq \alpha \leq 2$; $Li_aNi_{1-b-c}CO_bM_cO_{2-\alpha}X_2$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM_cD_c$, wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b}M_bM_cO_{2-\alpha}X_2$ wherein $0.90 \leq a \leq 1.8$, $0 \leq b \leq 0.5$, $0 \leq c \leq 0.05$, and $0 \leq \alpha \leq 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2GbO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu.

Examples of the positive active material include $LiCoO_2$, $LiMn_xO_{2x}$ where x=1 or 2, $LiNi_{1-x}Mn_xO_{2x}$ where 0≤x≤1, $LiNi_{1-y}Co_xMn_yO_2$ where 0≤x≤0.5 and 0≤y≤0.5, $LiFePO_4$, $TiS_2$, $FeS_2$, $TiS_3$, and $FeS_3$.

The positive active material layer may further optionally include a binder, a conductive agent, an electrolyte, or a combination thereof.

A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong. Any suitable binder may be used.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used. Any suitable conductive agent can be used The positive active material layer may be prepared by screen printing, slurry casting, or powder compression. However, the method is not limited thereto, and any suitable method may be used.

The negative electrode can be produced from a negative active material composition including a negative active material, and optionally, a conductive agent, a binder, an electrolyte, or a combination thereof. A suitable negative active material includes a material capable of storing and releasing lithium ions electrochemically. The negative electrode active material can comprise a carbon, such as a hard carbon, soft carbon, carbon black, ketjen black, acetylene black, activated carbon, carbon nanotubes, carbon fiber, graphite, or an amorphous carbon. Also usable are lithium-containing metals and alloys, for example a lithium alloy comprising Si, Sn, Sb, Ge, or a combination thereof. Lithium-containing metal oxides, metal nitrides, and metal sulfides are also useful, in particular wherein metal can be Ti, Mo, Sn, Fe, Sb, Co, V, or a combination thereof. Also useable are phosphorous (P) or metal doped phosphorous (e.g., $NiP_3$). The negative active material is not limited to the foregoing and any suitable negative active material can be used. In an embodiment the negative active material is disposed on a current collector, such as copper current collector. The negative active material may be graphite. In an embodiment, the negative electrode comprises lithium metal or a lithium metal alloy. Use of lithium metal is mentioned.

As is further disclosed above, the disclosed lithium solid electrolyte may be provided between the positive electrode and the negative electrode, and may be contained in the positive electrode, the negative electrode, or a combination thereof, e.g., as a protection layer.

The electrolyte can comprise a solid electrolyte in addition to the disclosed lithium solid electrolyte, a liquid electrolyte, a polymeric electrolyte, or a combination thereof. Additional electrolyte materials are disclosed in U.S. Pat. Nos. 7,901,658, 8,658,317, or 9450271, the contents of which are incorporated herein by reference in their entirety.

The solid electrolyte may comprise the lithium solid electrolyte disclosed herein, e.g., the lithium solid electrolyte of Formula 1, and may further comprise a sulfide solid electrolyte, an oxide solid electrolyte, or a combination thereof.

The sulfide solid electrolyte may comprise $Li_2S$—$P_2S_5$, $Li_2S$—$P_2S_5$—LiX, wherein X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein m and n are positive numbers, Z is one of Ge, Zn or Ga, $Li_2S$—$GeS_2$, $Li_2S$—$SiS_2$—$Li_3PO_4$, $Li_2S$—$SiS_2$-$Li_pM^1O_q$ wherein p and q are positive numbers, $M^1$ is P, Si, Ge, B, Al, Ga, or In, $Li_{7-x}PS_{6-x}Cl_x$ wherein 0<x<2, $Li_{7-x}PS_{6-x}Br_x$ wherein 0<x<2, or $Li_{7-x}PS_{6-x}I_x$ wherein 0<x<2. Mentioned are $Li_6PS_5Cl$, $Li_6PS_5Br$, or $Li_6PS_5I$.

The oxide solid electrolyte may comprise $Li_{1+x+y}Al_xTi_{2-x}Si_yP_{3-y}O_{12}$ wherein 0<x<2, 0≤y≤3, $BaTiO_3$, $PbZr_{(1-x)}Ti_xO_3$ wherein 0≤x≤1, $Pb_{1-x}La_xZr_{1-y}Ti_yO_3$ wherein 0≤x<1, 0≤y<1, $Pb(Mg_{1/3}Nb_{2/3})O_3$—$PbTiO_3$, $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, $Li_3PO_4$, $Li_xTi_y(PO_4)_3$ wherein 0<x<2, 0<y<3, $Li_xAl_yTi_z(PO_4)_3$, 0<x<2, 0<y<1, 0<z<3), $Li_{1-x+y}(Al_{(1-m)}Ga_m)_x(Ti_{(1-n)}Ge_n)_{2-x}Si_yP_{3-y}O_{12}$ (0≤x≤1, 0≤y≤1, 0≤m≤1, and 0≤n≤1, $Li_xLa_yTiO_3$ wherein 0<x<2, 0<y<3, $Li_xGe_yP_zS_z$, wherein 0<x<4, 0<y<1, 0<z<1, and 0<w<5, $Li_xN_y$, wherein 0<x<4 and 0<y<2, $SiS_2$, $Li_xSi_yS_z$ wherein 0<x<3, 0<y<2, 0<z<4, $Li_xP_yS_z$ wherein 0<x<3, 0<y<3 and 0<z<7, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, a garnet ceramics of the formula $Li_{3+x}La_3M^1_2O_{12}$ wherein $M^1$ is Te, Nb or Zr and x is an integer of 1 to 10, or a combination thereof. Mentioned is $(La_{1-x}Li_x)TiO_3$ (LLTO) wherein 0<x<1.

The garnet-type oxide can be of the formula $Li_{5+x}E_3(Me^2_zMe^2_{(2-z)})O_d$ wherein E is a trivalent cation; $Me^1$ and $Me^2$ are each independently one of a trivalent, tetravalent, pentavalent, and a hexavalent cation; 0<x≤3, 0≤z<2, and 0<d≤12; and O can be partially or totally substituted with a pentavalent anion, a hexavalent anion, a heptavalent anion, or a combination thereof. For example, E can be partially substituted with a monovalent or divalent cation. In another embodiment, for example, in the solid ion conductor, when 0<x≤2.5, E may be La and $Me^2$ can be Zr.

In an embodiment, the garnet-type oxide can be of the formula $Li_{5+x+2y}(D_yE_{3-y})(Me^1_zMe^2_{2-z})O_d$ wherein D is a monovalent or divalent cation; E is a trivalent cation; $Me^1$ and $Me^2$ are each independently a trivalent, tetravalent, pentavalent, or a hexavalent cation; 0<x+2y≤3, 0<y≤0.5, 0≤z<2, and 0<d≤12; and O can be partially or totally substituted with a pentavalent anion, a hexavalent anion, a heptavalent anion, or a combination thereof. The preferred number of moles of lithium per formula unit (Li-pfu) in the above formula is $6<(5+x+2y)<7.2$, $6.2<(5+x+2y)<7$, $6.4<(5+x+2y)<6.8$. In the garnet-type oxides of the above formulas, D can comprise potassium (K), rubidium (Rb), cesium (Cs), calcium (Ca), barium (Ba), or strontium (Sr). In an embodiment, D is calcium (Ca), barium (Ba), or strontium (Sr). In the above formulas, Me can be a transition metal. For example, Me can be tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), Zinc (Zn), or chromium (Cr). Mentioned is $Li_{6.5}La_3Zr_{1.5}Ta_{0.5}O_{12}$.

Also disclosed are compounds of the formula $Li_{1+(4-a)\alpha}Hf_{2-\alpha}M^a{}_\alpha(PO_{4-\delta})_3$, wherein M is at least one cationic element with valence of a, $0<\alpha\leq 2/3$, $1\leq a\leq 4$, and $0\leq\delta\leq 0.1$, such as $Li_{7/6}Hf_{11/6}Y_{1/6}(PO_4)_3$, $Li_{4/3}Hf_{5/3}Y_{1/3}(PO_4)_3$, $Li_{3/2}Hf_{3/2}Y_{1/2}(PO_4)_3$, $Li_{5/3}Hf_{5/3}Ca_{1/3}(PO_4)_3$, $Li_{5/3}Hf_{5/3}Mg_{1/3}(PO_4)_3$, and $Li_{4/3}Hf_{5/3}Sc_{1/3}(PO_4)_3$, $Li_{1.2}Hf_{1.95}(PO_4)_3$, or a combination thereof.

The solid electrolyte may be porous. The porous structure of the electrolyte can refer to an electrolyte having micro- and/or nanostructural features, e.g., microporosity and/or nanoporosity. For example, the porosity of the solid electrolyte comprising the compound of Formula 1 can be 10% to 90%, 20% to 80%, or 30% to 70%.

The liquid electrolyte may comprise a lithium salt and a solvent. Representative lithium salts include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, $NaAsF_6$, or a combination thereof.

The solvent may comprise a carbonate, an ester, an ether, a ketone, an alcohol, or a combination thereof. The carbonate may be linear or cyclic, and may be fluorinated. Representative carbonates include at least one selected from diethyl carbonate ("DEC"), dimethyl carbonate ("DMC"), dipropyl carbonate ("DPC"), methyl propyl carbonate ("MPC"), ethyl propyl carbonate ("EPC"), methyl ethyl carbonate ("MEC"), or a combination thereof, and the cyclic carbonate compound may be, for example, ethylene carbonate ("EC"), propylene carbonate ("PC"), butylene carbonate ("BC"), vinyl ethylene carbonate ("VEC"), fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methyl ethylene carbonate, 4,4,5-trifluoro-5-methylethylene carbonate, and trifluoromethyl ethylene carbonate. Representative esters include at least one selected from methyl acetate, ethyl acetate, n-propyl acetate, dimethyl acetate, methyl propionate, ethyl propionate, γ-butyrolactone, decanolide, valerolactone, mevalonolactone, caprolactone, and methyl formate. Representative ethers include at least one selected from dibutyl ether, tetraglyme, diglyme, 1,2-dimethoxy ethane, 1,2-diethoxy ethane, ethoxy methoxy ethane, 2-methyl tetrahydrofuran, and tetrahydrofuran. A representative ketone is cyclohexanone. Representative alcohols include methanol, ethanol, isopropanol, and butanol. The solvent may comprise a nitrile, such as a C1 to C20 nitrile; an amide such as formamide or dimethyl formamide; a dioxolane such as 1,2-dioxolane or 1,3-dioxolane; a sulfolane such as dimethyl sulfoxide, sulfolane, or methyl sulfolane; 1,3-dimethyl-2-imidazolinone; N-methyl-2-pyrrolidinone; nitromethane; trimethyl phosphate; triethyl phosphate; trioctyl phosphate; or triester phosphate. A concentration of the salt in the solvent may be 0.1 to 2 molar (M), e.g., 0.5 to 1.5 M.

The liquid electrolyte may comprise an ionic liquid. The ionic liquid may include a cation and an anion. The cation may be at least one of an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation. The anion may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N-$, $NO_3^-$, $Al_2Cl_7^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$.

In an aspect, the liquid electrolyte is disposed in a pore of the lithium solid electrolyte.

The polymeric electrolyte may comprise an ionically conductive polymer. Exemplary ionically conductive polymers can include but are not limited to polyethylene oxide, polyethylene oxide comprising a metal salt, poly(methyl (meth)acrylate), polypropylene oxide, polyvinylidene fluoride, polystyrene, polyvinyl chloride, polyvinyl alcohol, polyacrylonitrile, polyester sulfide, or a combination thereof. The ionically conductive polymer can optionally further comprise a lithium salt, for example $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or a combination thereof. In some embodiments, the ionically conductive polymer comprises the lithium salt, and is preferably a polyethylene oxide comprising the lithium salt.

The separator may be included between the positive electrode and negative electrode. The separator may comprise a glass fiber, polyester, polyethylene, polypropylene, polytetrafluoroethylene (PTFE), or a combination thereof. In an embodiment the separator may comprise a microporous polymeric film, such as a microporous polyethylene or microporous polypropylene film. In an embodiment the separator comprises the lithium solid electrolyte and a porous olefin film such as polyethylene and polypropylene. A diameter of a pore of the porous olefin film can be 0.01 to 10 micrometers (μm), and a thickness of the separator can be 5 to 300 μm. In an embodiment, the electrochemical cell comprises the lithium solid electrolyte on the porous separator. For example, the electrochemical cell may comprise a porous separator comprising a microporous polyethylene film having a pore size of 1 to 50 μm, 2 to 40 μm, or 5 to 30 μm, and a layer of the lithium solid electrolyte on the porous separator. The lithium solid electrolyte may be liquid-impermeable, may be non-porous, or may have a pore size of 0.01 to 1 μm, or 0.05 to 0.5 μm. The lithium solid electrolyte may serve as a separator.

The electrochemical cell can be made by a method comprising disposing the solid-state electrolyte film between a positive electrode and a negative electrode and inserting the assembly into a can, for example, to provide the electrochemical cell.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

All values and ranges are understood to be inclusive of the stated value and a range dictated by context, e.g., a degree of error associated with measurement of the particular quantity, or a tolerance in manufacture.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Substituted" means that the compound or group is substituted with at least one substituent(e.g., 1, 2, 3, or 4), and each substituents is independently a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (=N—NH$_2$), a carbonyl (—C(=O)—), a carbamoyl group (—C(O)NH$_2$), a sulfonyl (—S(=O)$_2$—), a thiol (—SH), a thiocyano (—SCN), a tosyl (CH$_3$C$_6$H$_4$SO$_2$—), a carboxylic acid (—C(=O)OH), a carboxylic C1 to C6 alkyl ester (—C(=O)OR wherein R is a C1 to C6 alkyl group), a carboxylic acid salt (—C(=O)OM) wherein M is an organic or inorganic anion, a sulfonic acid (—SO$_3$H$_2$), a sulfonic mono- or dibasic salt (—SO$_3$MH or —SO$_3$M$_2$ wherein M is an organic or inorganic anion), a phosphoric acid (—PO$_3$H$_2$), a phosphoric acid mono- or dibasic salt (—PO$_3$MH or —PO$_3$M$_2$ wherein M is an organic or inorganic anion), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, or a C3 to C12 heteroaryl instead of hydrogen, provided that the substituted atom's normal valence is not exceeded. The indicated number of carbon atoms for any group herein is exclusive of any substituents.

Hereinafter the disclosed lithium solid electrolyte is described in detail. The examples are provided for illustrative purposes only and are not intended to limit the scope of the present disclosure.

EXAMPLES

Example 1. Preparation of $Li_{6.25}Al_{0.25}La_3Zr_2O_{12}$

Materials

All chemicals are used as received without further purification. LiNO$_3$ (>99%), Zirconium(IV) acetylacetonate (97%), and 1-methoxy-2-propanol (≥99.5%) are purchased from SIGMA-ALDRICH®. Al(NO$_3$)$_3$.9H$_2$O, La(NO$_3$)$_3$.6H$_2$O (99.99%), and bis(2-ethylhexyl) phthalate are purchased from ALFA AESAR. Methanol is purchased from VWR™. Polished MgO (100) substrates (10×10×0.5 mm) are purchased from MTI CORPORATION.

Preparation of Spray Composition

A composition for spray pyrolysis is prepared by dissolving: 3.6059 grams (g) of LiNO$_3$, 0.4459 g of Al(NO$_3$)$_3$.9H$_2$O, 6.1765 g of La(NO$_3$)$_3$.6H$_2$O, and 4.6373 g zirconium (IV) acetylacetonate in a composition comprising equal parts by volume (140 mL) methanol (boiling point 64.7° C., 1-methoxy-2-propanol (boiling point 120° C., and bis(2-ethylhexyl) phthalate (boiling point 385° C.) to form a solution having a boiling point of 190° C. The La, Al, and Zr salts are used in a stoichiometric amount for $Li_{6.25}Al_{0.25}La_3Zr_2O_{12}$, and the Li salt ($LiNO_3$) is used in a 75% stoichiometric excess (corresponding to $Li_{11}$) to accommodate the Li loss during the post-annealing process.

The composition is stirred overnight for at least 12 hours. The concentration of the prepared composition is 0.01 molar (M) in terms of $Li_{6.25}Al_{0.25}La_3Zr_2O_{12}$.

Spray Pyrolysis

The composition is loaded into a polypropylene syringe and pumped at 5-30 mL/hour into a spray gun (DeVILBISS, AG361) using compressed air as the carrier gas with a pressure at the atomizer of 0.3 bar. MgO substrates are placed on a heated stainless steel plate. The substrate temperature is 300° C., and the distance between the MgO substrate and the atomizer is set to 24 cm.

The composition was sprayed onto the hot MgO substrate for two hours with a spray rate of 10 mL/hour (20 mL composition sprayed in total).

DSC Analysis

Differential Scanning calorimetry (DSC) is carried out with a METTLER TOLEDO DSC/TGA system from room temperature to 1000° C. An MgO crucible is used to prevent interdiffusion and reaction between the crucible and the lithium solid electrolyte. Synthetic air is used as purge gas, and high purity Ar is used as protection gas during the DSC experiments. The as-deposited lithium solid electrolyte film is scratched off from the MgO substrate and transferred to the MgO crucible for the DSC experiments.

Figure 4:
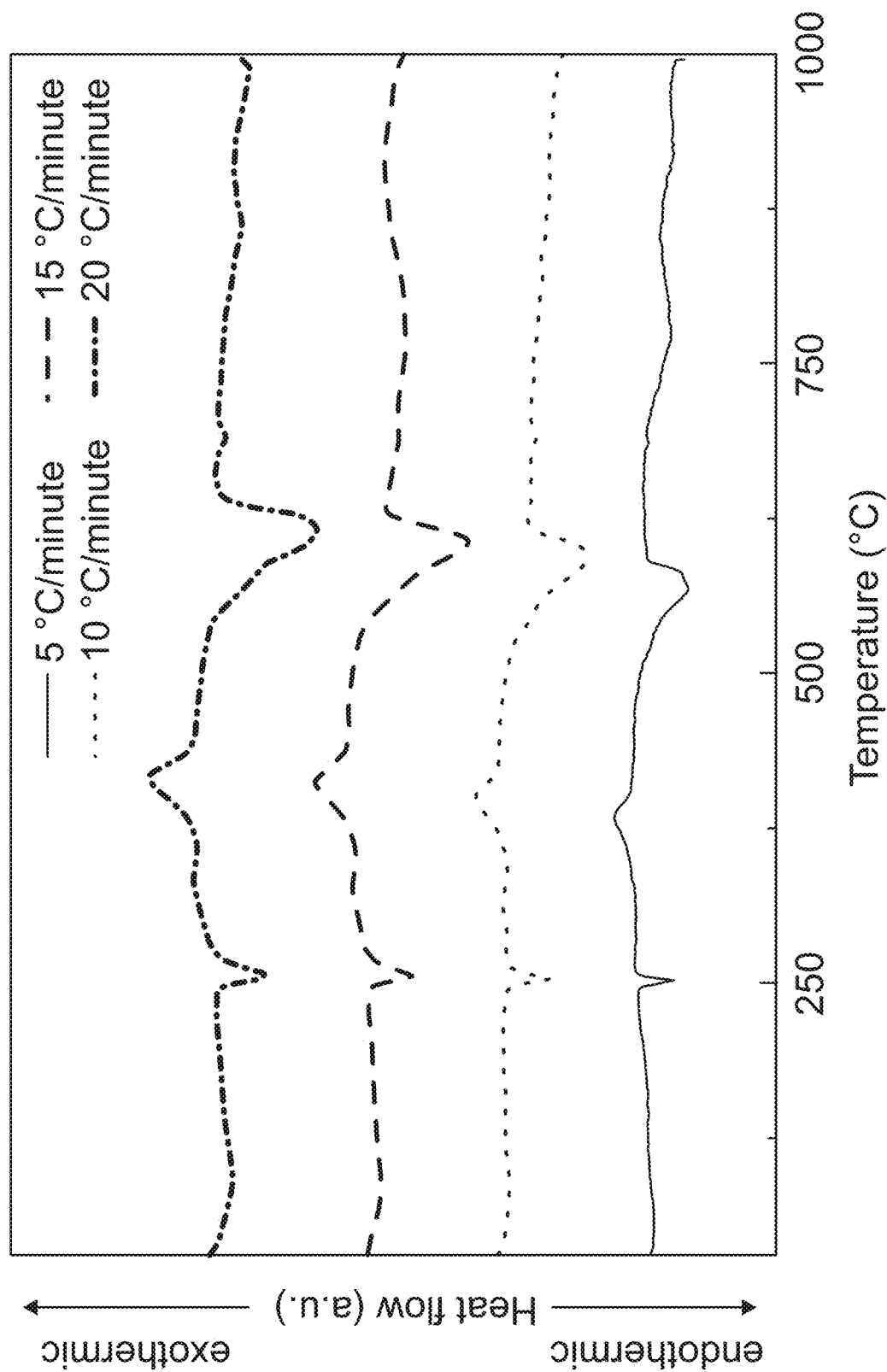
FIG. 4 is graph of energy (arbitrary units, a.u.) versus temperature (° C.) showing the results of DSC analysis of the lithium solid electrolyte of Example 1.

Shown in FIG. 4 are the results of DSC analysis of the $Li_{6.25}Al_{0.25}La_3Zr_2O_{12}$ of Example 1, analyzed using heating rates of ramp rates of 5° C./minute, 10° C./minute, 15° C./minute, and 20° C./minute. Each DSC result shows four peaks, with a first peak identified as $LiNO_3$ melting, the second peak identified as the decomposition of residual organics left from the spray solvents, and the last two peaks identified as the $LiNO_3$ decomposition and lithium solid electrolyte crystallization.

Figure 5:
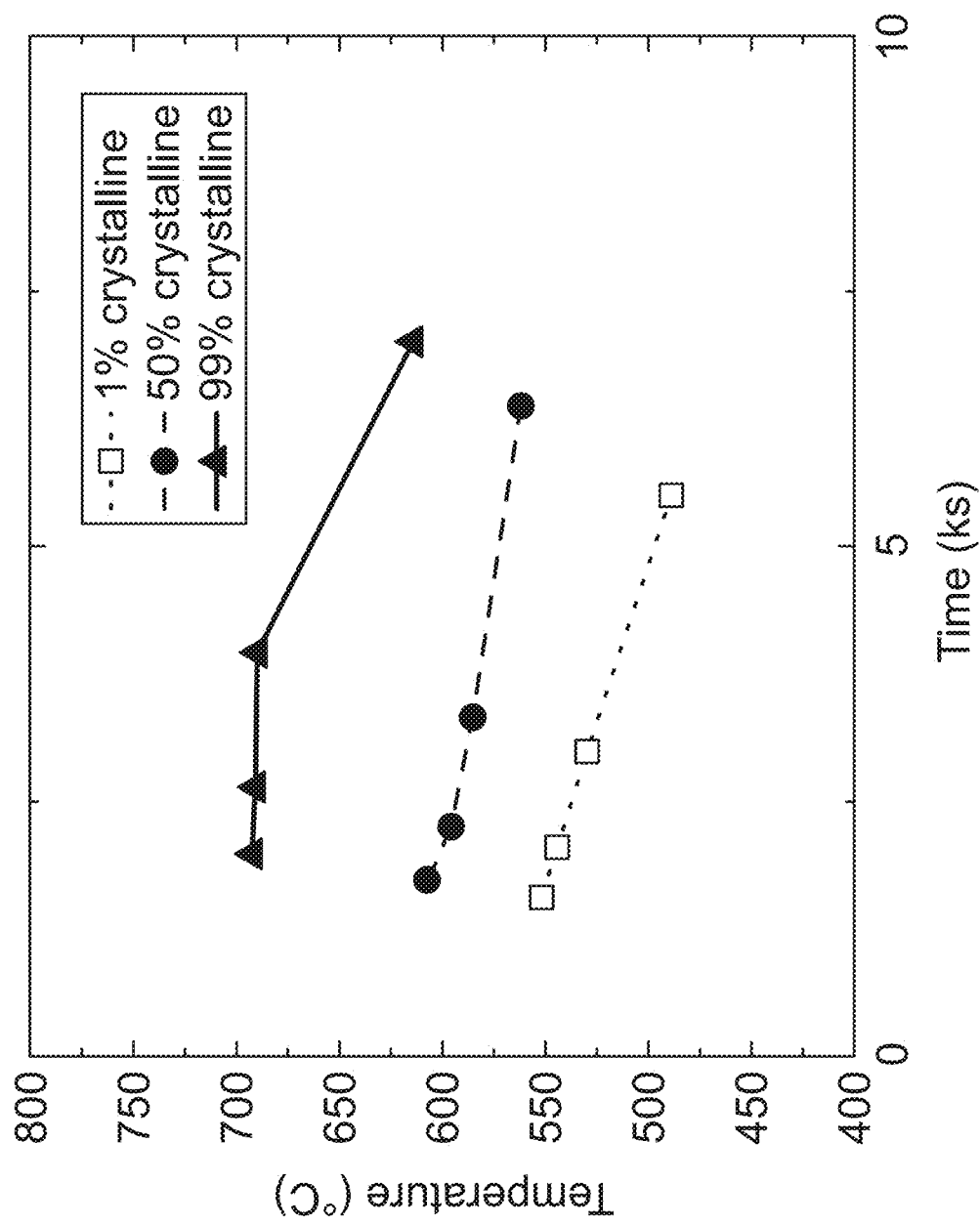
FIG. 5 is a graph of temperature (° C.) versus time (kiloseconds, kS) showing the results of analysis of the results shown in FIG. 3.

Crystallization faction can be estimated by integration of the $LiNO_3$ decomposition and lithium solid electrolyte crystallization peaks to provide the Time-Temperature-Transformation (TTT) diagram shown in FIG. 5. The TTT diagram of FIG. 5 shows that at a temperature below 450° C., the Li-precursor ($LiNO_3$) is not fully decomposed and a mixture of amorphous metal oxides (e.g., La, Zr, and Al-oxides) and melted $LiNO_3$ are present. Above 450° C., three phase regions are observed, including amorphous (<1% crystalline), biphasic (1%<crystalline<99%), and crystalline cubic (crystalline>99%) regions. The TTT diagram indicates annealing time and temperature to provide a crystalline lithium solid likely product having the desired cubic structure. The presence of the cubic phase is supported by the Raman results.

Example 2A

Lithium solid electrolyte films were prepared using the method of Example 1, with the addition of heating at a rate of 10° C. per minute to 750° C., holding at 750° C. for 0.25 hours (h), and then cooling to ambient temperature.

Example 2B

Lithium solid electrolyte films were prepared using the method of Example 1, with the addition of heating at a rate of 10° C. per minute to 650° C., holding at 650° C. for 5 h, and then cooling to ambient temperature.

Example 2C

Lithium solid electrolyte films were prepared using the method of Example 1, with the addition of heating at a rate of 10° C. per minute to 525° C., holding at 525° C. for 10 h, and then cooling to ambient temperature.

Example 2D

Lithium solid electrolyte films were prepared using the method of Example 1, with the addition of heating at a rate of 10° C. per minute to 500° C., holding at 500° C. for 10 h, and then cooling to ambient temperature.

SEM Analysis

Samples for SEM analysis are cross sectioned with a diamond blade and attached to a sample stage via carbon-conductive tape. Scanning electron microscopy (SEM) images are collected on a ZEISS Supra55VP field emission scanning electron microscope operated between 3.0-10.0 kV using both the In-lens SE and the Everhart-Thornley SE detectors.

Figure 6:
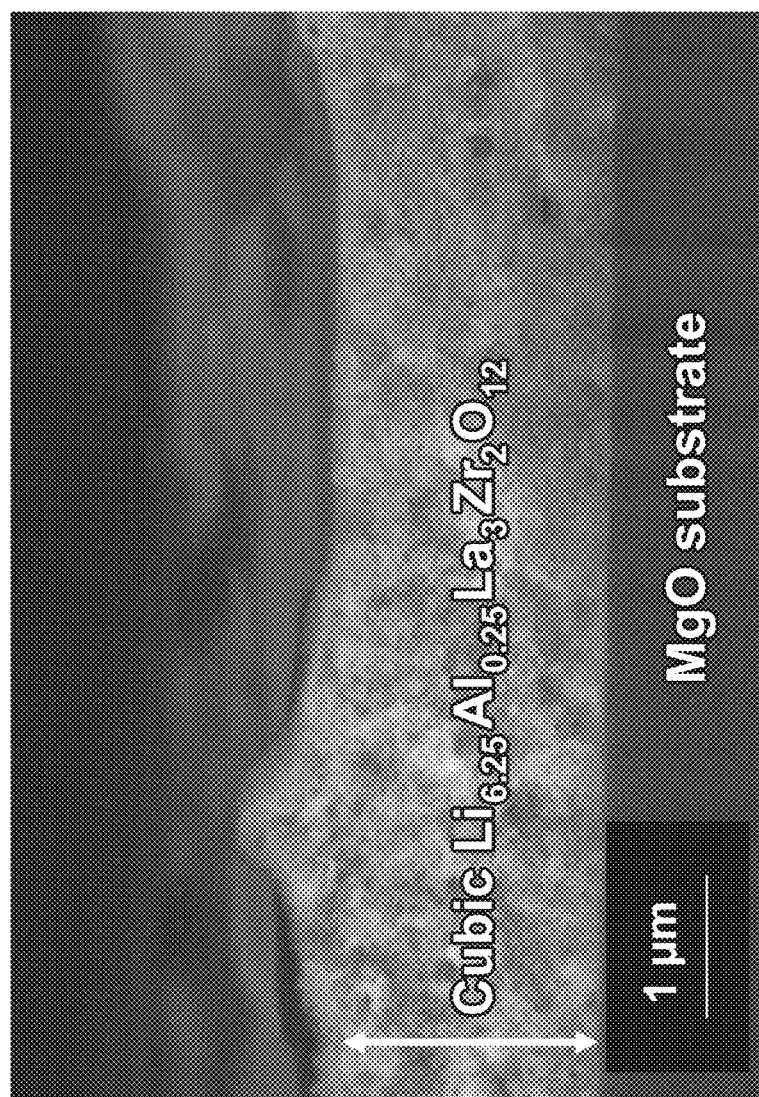
FIG. 6 is an SEM image of the lithium solid electrolyte of Example 2A.

FIG. 6 is an SEM image of the solid electrolyte of Example 2A. The lithium solid electrolyte is observed to have an average thickness of 3.5 micrometers (μm). Porosity is not observed by SEM in the lithium solid electrolyte of Example 2A.

Raman Analysis

Raman spectroscopy is completed on a WITec Raman instrument with a spectral resolution of 0.7 cm$^{-1}$ at 10 milliwatts (mW) and a wavelength of 532 nanometers (nm). The wavelength of 532 was selected to ensure a low penetration depth.

Figure 7:
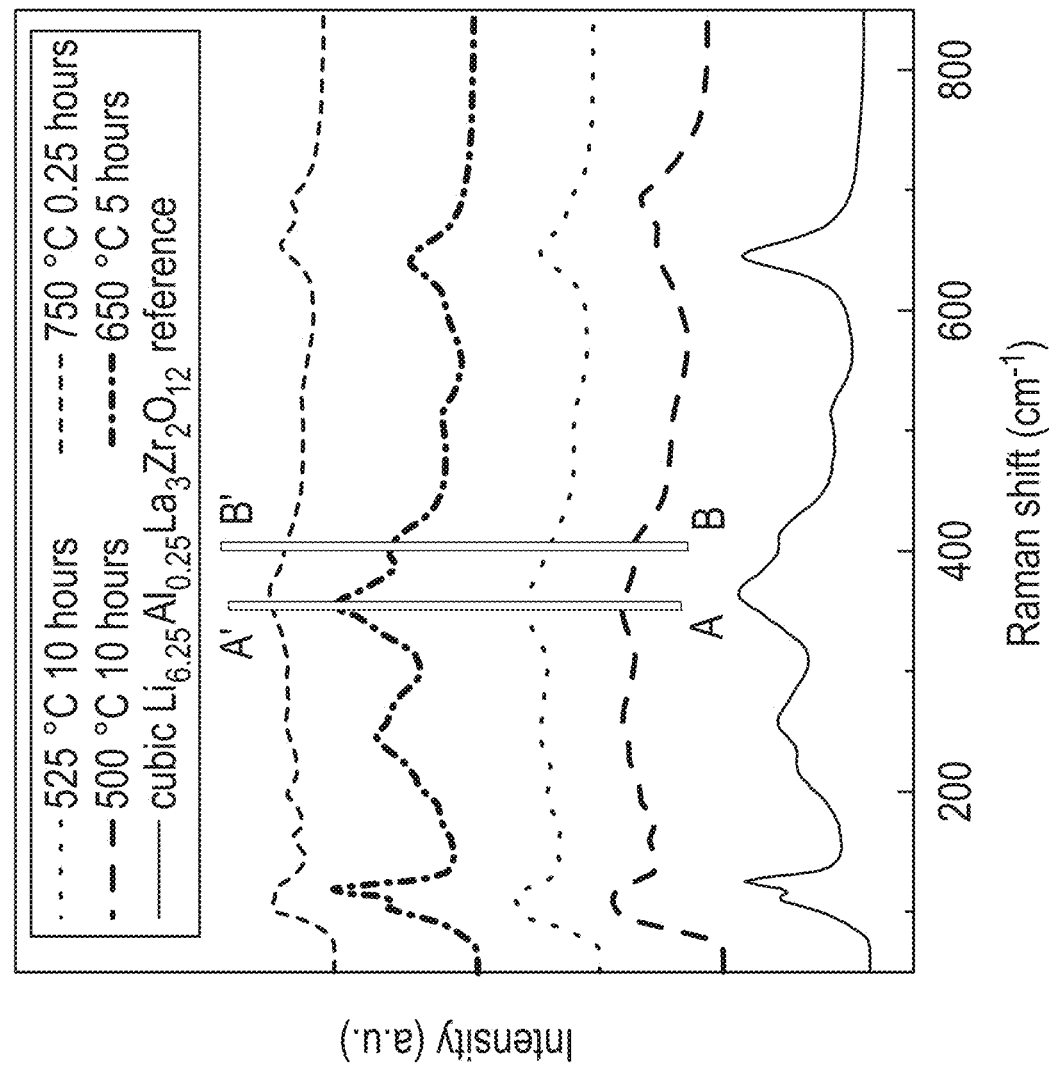
FIG. 7 is a graph of intensity (arbitrary units, a.u.) versus Raman Shift (wavenumber, cm$^{-1}$) showing the results of Raman analysis of the materials of Examples 2A to 2D.

Raman spectra of the lithium solid electrolyte of Examples 2A to 2D are shown with a reference spectrum for cubic $Li_7La_3Zr_2O_{12}$ in FIG. 7. The results shown in FIG. 7 show that each of the materials of Examples 2A to 2D are isostructural with cubic $Li_7La_3Zr_2O_{12}$. While not wanting to be bound by theory, it is understood that the Raman resonances shift due to changes in the bond lengths, and the bond length corresponds to activation energy. Because lithium ion conduction occurs due to a hopping mechanism, whereby a lithium ion breaks a Li—O bond at a first site, hops to an adjacent site, and reforms a second Li—O bond, the activation energy is understood to correspond to ionic conductivity. In addition, and as illustrated by lines A-A' and B-B', the peaks corresponding to the Li—O vibration in $Li_7La_3Zr_2O_{12}$ centered at 354 cm$^{-1}$ and 410 cm$^{-1}$ are shifted by 0 cm$^{-1}$ in the electrolyte of Example 2D annealed at 500° C., and shifted to a greater wavenumber in the electrolytes of Examples 2A to 2C. The peaks are centered at 367.6 cm$^{-1}$ and 406.9 cm$^{-1}$ in the electrolyte of Example 2A, 353.8 cm$^{-1}$ and 401.4 cm$^{-1}$ in the electrolyte of Example 2B, and 352.7 cm-1 and 409.1 cm$^{-1}$ in the electrolyte of Example 2C. While not wanting to be bound by theory, it is understood that the observed shift indicates that the disclosed process provides a lithium solid electrolyte having greater lattice spacing and reduced local stress, and therefore macroscopically and reduced local tensile stress, than materials annealed at a greater temperature, e.g., above 750° C., such as 750° C. to 1000° C.

Because the disclosed process can provide a crystalline material having the desired cubic structure at 500° C., use of the disclosed process provides opportunities for reducing the post processing thermal budget and broadens the range of suitable materials for devices to be processed with the lithium solid electrolyte.

Stress Analysis

Figure 8:
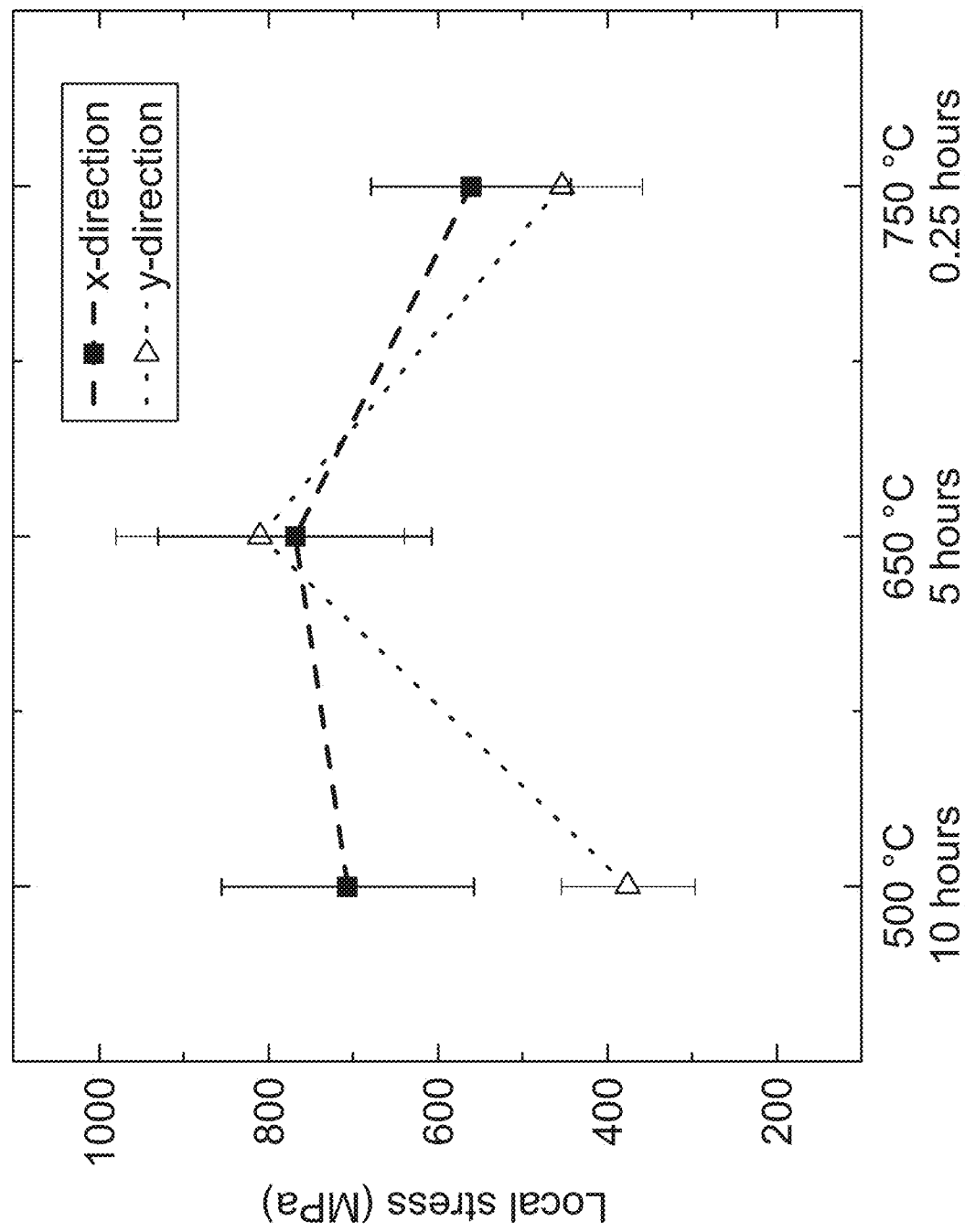
FIG. 8 is a graph of local stress (megaPascals, MPa) for materials annealed at 500° C. for 10 hours, 650° C. for 5 hours, and 750° C. for 0.25 hours.

The results of stress analysis by multi-beam optical sensing are shown in FIG. 8 for the materials of Examples 2A, 2C, and 2D. In FIG. 8, x and y refer to directions perpendicular to each other, both along the edges of the 1×1 cm sample. The material prepared 500° C. has a local stress the same as or less than the material annealed at 750° C., illustrating that the disclosed process provides an electrolyte having reduced local stress.

It should be understood that the embodiment described herein should be considered in a descriptive sense only and not for purposes of limitation. Descriptions of features or aspects within each embodiment should be considered as available for other similar features or aspects in other embodiments.

While the disclosed embodiment has been described with reference to the figures, it will be understood by those of ordinary skill in the art that various changes in form and details may be made therein without departing from the spirit and scope as defined by the following claims.

What is claimed is:

1. A method of manufacturing a lithium solid electrolyte, the method comprising:
   dissolving a lithium precursor, a lanthanum precursor, and a zirconium precursor in a solvent comprising methanol, a substituted propanol, and a substituted phthalate to form a solution;
   disposing the solution on a substrate having a temperature of 270° C. to 500° C. to form a film; and
   heat-treating the film at 300° C. to less than 750° C. for 1 hour to 100 hours to manufacture the lithium solid electrolyte.

2. The method of claim 1, wherein the solution further comprises a Ca precursor, a Mg precursor, an Al precursor, a Ga precursor, or a combination thereof.

3. The method of claim 1, wherein the lithium precursor is contained in the solution in an amount corresponding to a stoichiometric excess for a compound of Formula 1

$$Li_{(7.2-2x-3y)}A_xM_yLa_3Zr_2O_{12} \quad (1)$$

wherein A is Ca or Mg, M is Al or Ga, and wherein 0≤x≤0.5 and 0≤y≤0.5, relative to a content of the lanthanum precursor, the zirconium precursor, and the Ca precursor, the Mg precursor, the Al precursor and the Ga precursor, if present.

4. The method of claim 3, wherein the stoichiometric excess is 1% to 300%.

5. The method of claim 1, wherein the lanthanum precursor and the zirconium precursor are contained in the solution in an amount corresponding to a stoichiometric amount for a compound of Formula 1

$$Li_{(7.2-2x-3y)}A_xM_yLa_3Zr_2O_{12} \quad (1)$$

wherein A is Ca or Mg, M is Al or Ga, and wherein 0≤x≤0.5 and 0≤y≤0.5, relative to a content of the lanthanum precursor, the zirconium precursor, and the Ca precursor, the Mg precursor, the Al precursor, and the Ga precursor, if present.

6. The method of claim 1, wherein a concentration of the lithium precursor, the lanthanum precursor, and the zirconium precursor in the solvent is 0.01 molar to 0.1 molar.

7. The method of claim 1, wherein the disposing of the solution comprises spraying the solution.

8. The method of claim 7, wherein the spraying comprises using air as a carrier gas.

9. The method of claim 8, wherein the spraying comprises spraying with a pressure at an atomizer of 0.01 megaPascals to 0.1 megaPascals.

10. The method of claim 9, wherein the spraying comprises spraying in air at an ambient pressure.

11. The method of claim 1, wherein the heat-treating comprises heat-treating at 450° C. to 550° C.

12. The method of claim 11, wherein the heat-treating comprises heat-treating for 2 hours to 20 hours.

13. The method of claim 1, wherein the lithium solid electrolyte has a thickness of 0.1 μm to 10 μm.

14. The method of claim 1, wherein the lithium solid electrolyte has a degree of crystallinity of 50% to 99%.

15. The method of claim 1, wherein the lithium solid electrolyte has a local stress 10 megaPascals to 10 gigaPascals, when determined by multi-beam optical sensing.

16. The method of claim 1, wherein the lithium solid electrolyte has a residual stress of 10 megaPascals to 10 gigaPascals, when determined by multi-beam optical sensing.

17. The method of claim 1,
   wherein the lithium solid electrolyte has a peak in a Raman spectrum that corresponds to a peak in cubic $Li_7La_3Zr_2O_{12}$ phase between 350 cm$^{-1}$ and 400 cm$^{-1}$, and
   wherein the peak in the Raman spectrum of the lithium solid electrolyte occurs at a wavenumber between 0 cm$^{-1}$ and 50 cm$^{-1}$ greater than a wavenumber of the corresponding peak in cubic $Li_7La_3Zr_2O_{12}$.

* * * * *